United States Patent Office 3,312,732
Patented Apr. 4, 1967

3,312,732
AMINOALKYL AMINOALKANETHIOLS
Morton H. Gollis, Brookline, Robert J. Wineman, Concord, and John C. James, Melrose, Mass., assignors to Monsanto Research Corporation, St. Louis, Mo., a corporation of Delaware
No Drawing. Filed Feb. 28, 1962, Ser. No. 176,407
17 Claims. (Cl. 260—501)

This invention relates to new chemical compounds, and more particularly, provides novel aminoalkyl aminoalkanethiols.

When the nitrogen atoms of an amine radical carry hydrogen as a substituent, that is, are primary or secondary amino nitrogen, the compound is capable of activity such as hydrogen bonding in a biological system, chemical reactivity and the like, making it significantly different from a tertiary amine. Thus, aminoalkanethiols found active as antiradiation drugs in biological systems have been primary and secondary amines.

An aminoalkyl aminoalkanethiol is a tridentate compound, and while tridentate compounds may be chelating agents, coordination compounds which are tetradentate are generally much preferred. If the terminal amine group is primary or secondary, its chemical reactivity makes it possible to convert the amine to a Schiff's base or other derivative providing the desired fourth coordinating position.

N-mercaptoalkylated monoamines have been prepared by reacting the amine with an alkylene sulfide, such as ethylene sulfide, 2-methylpropylene sulfide, and so forth. However, this reaction is not entirely straightforward. When the amine is primary, both the amine hydrogens can be displaced by mercaptoalkyl radicals, giving, for example, butylaminobis(propanethiol) along with the expected (butylamino)propanethiol as the product of reaction of butylamine and propylene sulfide. When this type of double addition is prevented because the amine is secondary, as exemplified by dibutylamine, then the (dibutylamino)ethanethiol expected from its reaction with ethylene sulfide is found to be accompanied by the product of addition of 2 moles of ethylene sulfide, 2-(2-dibutylaminoethylthio)ethanethiol, $$(C_4H_9)_2N-CH_2CH_2-S-CH_2CH_2SH$$

Proceeding to the diamines makes for additional complications. In the first place, ethylene sulfide tends to form polymers by adding to itself rather than to the amine group in the presence of these amines containing a second polar group. Besides, diamines offer two sites for attack by the alkylene sulfide. Thus, the reported product of reaction of piperazine with ethylene sulfide is N,N'-bis(2-mercaptoethyl)piperazine,

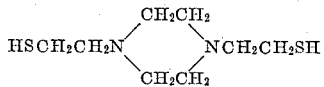

One of the nitrogen atoms can be blocked by making it tertiary, as in N,N-diethylethylene diamine:

$$(CH_3CH_2)_2NCH_2CH_2NH_2$$

but then the possible products are limited to aminoalkanethiols in which one nitrogen is tertiary.

Accordingly, it is understandable that the aminoalkanethiols which have been prepared and made available up to now have not included primary and secondary amines such as $$H_2N-CH_2CH_2-NH-CH_2CH_2SH$$

It is an object of this invention to provide novel aminoalkylamino alkanethiols.

A particular object of this invention is to provide aminoalkylamino alkanethiols in which the terminal nitrogen atom is primary or secondary, carrying at least one hydrogen atom as a substituent.

Another object is to provide a novel method of treating biological organisms to protect them from harmful conditions such as exposure to ionizing radiation.

These and other objects will become evident from a consideration of the following specification and claims.

The amines of this invention are N-(aminoalkyl)aminoalkanethiols of the formula

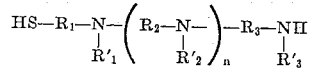

wherein

Each R is saturated aliphatic hydrocarbon,
Each R' is selected from the class consisting of hydrogen and saturated aliphatic hydrocarbon, and
$n$ is an integer selected from 0 and 1, containing at least two nitrogen atoms each having at least one hydrogen atom as a substituent.

By each R is meant each of $R_1$ and $R_2$, and by each R' each of $R'_1$, $R'_2$ and $R'_3$. In the amines of the invention, each hydrocarbon radical may contain up to 18 carbon atoms. The compounds in which saturated aliphatic hydrocarbon is lower aliphatic, containing up to six carbon atoms are preferred. For stability, at least two carbon atoms should intervene between an amine nitrogen atom and other hetero atoms (non-carbon atoms such as S or N). Preferably, the number of carbon atoms intervening between N and S is from 2 to 3.

The stated compounds can be used to protect mammalian organisms from the lethal effects of ionizing radiation.

Compounds provided by the invention include primary amines such as diamines, illustrative of which are 2-[(2-aminoethyl)amino]ethanethiol,
2-[(3-aminopropyl)amino]ethanethiol,
3-[(2-aminoethyl)amino]-1-propanethiol,
2-[(2-aminobutyl)amino]ethanethiol,
2-[(6-aminohexyl)amino]ethanethiol,
1-[(6-aminohexyl)amino]-2-propanethiol,
2-[(4-aminobutyl)amino]ethanethiol,
2-[(5-aminopentyl)amino]ethanethiol,
2-[(7-aminoheptyl)amino]ethanethiol,
2-[(8-aminooctyl)amino]ethanethiol,
2-[(10-aminodecyl)amino]ethanethiol,
2-[(12-aminododecyl)amino]ethanethiol,
2-[(18-aminooctadecyl)amino]ethanethiol,
2-[(2-aminooctyl)amino]ethanethiol,
3-[(4-aminobutyl)amino]-1-propanethiol,
4-[(2-aminoethyl)amino]-1-butanethiol,
2-[(3-aminopropyl)amino]-1-hexanethiol,
2-[(2-aminoethyl)amino]-3-dodecanethiol,
6-[(3-aminopropyl)amino]-1-hexadecanethiol,
2-[(6-aminohexyl)amino]-1-hexanethiol, and the like.

Also included in the scope of the invention are compounds conforming to the above stated description which include cycloaliphatic ring systems, and thus, further illustrative of the scope of this invention are amine compounds such as 2-[(4-aminocyclohexyl)amino]ethanethiol,
3-[(4-aminocyclohexyl)amino]-1-propanethiol,
2-[(3-aminocyclohexyl)amino]ethanethiol,
2-[(4-aminocyclohexylmethyl)amino]ethanethiol,
2-[(4-aminomethylcyclohexylmethyl)amino]ethanethiol,
2-[(4-aminomethylcyclohexylmethyl)amino]butane-1-thiol, 3-[4-aminomethylcyclohexylmethyl)amino]propanethiol,
2-[(4-aminomethyl-3-methylcyclohexylmethyl)amino]
 ethanethiol,
4-[(12-aminododecyl)amino]cyclohexanethiol, and so forth.

The invention also includes mercaptoethylated diamines in which both nitrogen atoms are secondary amines. Thus for example, illustrative of these compounds are 2-[(methylaminoethyl)amino]ethanethiol,
2-[(2-methylaminopropyl)amino]ethanethiol,
2-[(3-ethylaminopropyl)amino]ethanethiol,
3-[(3-ethylaminopropyl)amino]propanethiol,
3-[(2-butylamionethyl)amino]propanethiol,
2-[(2-butylaminoethyl)amino]ethanethiol,
2-[(5-propylaminopentyl)amino]ethanethiol,
3-[(6-isobutylaminohexyl)amino]propanethiol,
2-[(2-butylaminobutyl)amino]ethanethiol,
2-[(12-methylaminododecyl)amino]-1-butanethiol,
3-[(10-methylaminodecyl)amino]-1-propanethiol,
3-[18-methylaminooctadecyl)amino]-1-propanethiol,
2-[(2-dodecylaminoethyl)amino]ethanethiol, and so forth.

Where these compounds include a cycloaliphatic ring, illustrative thereof are, for example, 2-[(2-methylaminocyclohexyl)amino]ethanethiol,
2-[(4-methylaminomethylcyclohexyl)methyl amino]-1-
 propanethiol,
4-[(4-methylaminocyclohexylmethyl)amino]-1-
 butanethiol,
2-[(4-ethylaminomethylcyclohexylmethyl)amino]
 ethanethiol,
2-[(2-cyclohexylaminoethyl)amino]ethanethiol, and the like.

As shown by the above formula the invention is also inclusive of derivatives of dialkylene triamines wherein at least two of the nitrogen atoms present are primary or secondary amino, that is, are each hydrogen-substituted. Thus for example, the invention includes primary amines wherein each nitrogen atom contains a hydrogen substituent such as 2-[2-(2-aminoethylamino)ethylamino]ethanethiol,
3-[2-(2-aminoethylamino)ethylamino]propanethiol,
2-[2-(3-aminopropylamino)ethylamino]ethanethiol,
2-[3-(3-aminopropylamino)propylamino]ethanethiol,
3-[3-(3-aminopropylamino]propanethiol,
2-[2-(12-aminododecylamino)ethylamino]ethanethiol,
2-[6-(6-aminohexylamino)hexylamino]ethanethiol,
3-[8-(8-aminooctylamino)octylamino]ethanethiol, and so forth.

The invention also includes secondary amines in which each nitrogen atom carries a hydrogen substituent such as 2-[2-(2-methylaminoethylamino)ethylamino]ethanethiol,
3-[2-(2-ethylaminoethylamino)ethylamino]propanethiol,
2-[3-(3-methylaminopropylamino)propylamino]
 ethanethiol,
3-[3-(3-isopropylaminopropylamino)propylamino]
 propanethiol,
2-[2-(2-butylaminoethylamino)ethylamino]ethanethiol,
2-[2-(2-cyclohexylaminoethylamino)ethylamino]
 ethanethiol,
2-[4-(2-methylaminomethylcyclohexylethylamino)
 ethylamino]ethanethiol, and so forth.

Also included in the scope of the invention are mercapto-alkylated dialkylenetriamines wherein one nitrogen atom is tertiary amine. Thus, for example, the invention includes such amines wherein the mercaptoalkylated nitrogen atom is a tertiary amine group, such as 2-([2-(2-aminoethylamino)ethyl]methylamino)
 ethanethiol,
3-([3-(3-aminopropylamino)propyl]methylamino)-1-
 propanethiol,
2-([3-(3-aminopropylamino)propyl]methylamino)
 ethanethiol,
2-(butyl[2-(2-aminoethylamino)ethyl]amino)
 ethanethiol, and so forth.

In a further embodiment of the invention, the tertiary amine group may be the center nitrogen atom of the dialkylene triamine, as illustrated by amines including a tertiary and a primary amine group such as 2-(2-[(2-aminoethyl)methylamino]ethylamino)
 ethanethiol,
2-(3-[(3-aminopropyl)methylamino]propylamino)
 ethanethiol,
3-(3-[(3-aminopropyl)methylamino]propylamino)
 1-propanethiol,
2-(3-[(3-aminopropyl)butylamino]propylamino)
 ethanethiol,
2-([4-([(2-aminoethyl)methylamino]methyl)cyclo-
 hexylmethyl]amino)ethanethiol,
2-(12-[(2-aminoethyl)methylamino]dodecylamino)
 ethanethiol and so forth.

Further, the invention includes such centrally tertiary amines which contain only secondary, and no primary amine groups, such as 2-(2-[(2-methylaminoethyl)methylamino]
 ethylamino)ethanethiol,
2-(3-[(3-methylaminoethyl)methylamino]propylamino)
 ethanethiol,
2-(3-[(3-methylaminopropyl)methylamino]propylamino)
 ethanethiol,
2-(2-[(2-butylaminoethyl)butylamino]ethylamino)
 ethanethiol, and so forth.

Finally, the nitrogen atom furthest removed from the mercaptan radical may be the tertiary nitrogen atom, as illustrated by 2-(2-[(2-dimethylaminoethyl)amino]ethylamino)
 ethanethiol,
2-(3-[3-dimethylaminopropyl)amino]propylamino)
 ethanethiol,
3-(3-[(3-dimethylaminopropyl)amino]propylamino)
 propanethiol,
2-(3-[(3-dibutylaminopropyl)amino]propylamino)
 ethanethiol,
2-(4-[(2-dimethylaminoethyl)aminomethyl]
 cyclohexylmethylamino)ethanethiol,
2-(10-[(2-diethylaminoethyl)amino]decylamino)
 ethanethiol and so forth.

Referring now to the preparation of the presently provided compounds, the useful kinds of synthetic methods for producing the aminoalkanethiols of the invention may be regarded as including two general types. The first is a ring-opening reaction and the second is a condensation reaction.

Ring-opening reactions are adapted to introduce mercaptoalkyl and aminoalkyl radicals into amines to provide the compounds of the invention. Ring opening of ethylene sulfide may be used to supply the mercaptoethyl radical, and ring opening of ethylene imine or a like alkylene imine, to introduce an amino alkyl radical.

Thus, a useful method for the preparation of the 2-mercaptoethylamino compounds of the invention is the mercaptoethylation of an alkylene diamine or dialkylene triamine with ethylene sulfide. For example, the reaction of 1,3-propanediamine with ethylene sulfide may be employed to produce addition with ring opening, forming 2-[(3-aminopropyl)amino]ethanethiol. It has been noted above that a difficulty with such a synthesis is the many possible side reactions forming products other than the desired mono-mercaptoalkylated polyamine. This difficulty can, however, be overcome, at least in some instances, by the procedure described below and illustrated in examples hereinafter. Briefly stated, such procedure consists in gradual addition of a solution of alkylene sulfide to a very large excess of the amine in an inert solvent maintained in an inert atmosphere at reflux temperatures of about 50–100° C.

The amines which may advantageously be employed in this connection are primary amines containing the residue of the desired product, to which the N-mercaptoalkyl radical needs to be added as an amine nitrogen substituent to produce the compounds of the invention. Thus, useful amines include diamines in which both amine groups are primary, such as ethylenediamine, 1,2-propanediamine, 1,3-propanediamine, 1,2-butanediamine, 1,3-butanediamine, 1,4-butanediamine, 1,5-pentanediamine, 1,6-hexanediamine, 1,7-heptanediamine, 1,8-octane diamine, 1,2-octanediamine, 1,10-decanediamine, 1,12-dodecanediamine, 1,16-hexadecanediamine, 1,18-octadecanediamine, and like primary amines. Other useful aliphatic diamines include cycloaliphatic diamines such as 1,4-cyclohexanediamine, cyclohexylene-1,4-bis(methylamine), cyclohexylene-1,4-bis(2,2'-ethylamine) and so forth Illustrative useful alkylene diamines in which one amine is primary and the other secondary are N-methylethylenediamine, N-butylethylenediamine, N-ethyl-1,3-propanediamine, N-butyl-1,2-propanediamine, N-methyl-1,4-butanediamine, N-isopropyl-1,6-hexanediamine, N-methyl-1,8-octanediamine, N-ethyl-1,5 - pentanediamine and so forth.

The useful dialkylene triamines include for example those containing 2 primary and 1 secondary amine nitrogen atom such as diethylenetriamine, dipropylene triamine, N-(2-aminoethyl)-1,3 - propanediamine, N-(2-aminoethyl)cyclohexylene-1,4 - bis(methylamine), N-(2-aminoethyl)-1,12-octadecanediamine and so forth.

The dialkylene triamine may also contain two primary and one tertiary amine configuration, as illustrated by 4-methyldiethylenetriamine, 4-butyldiethylenetriamine, 5-methyldipropylenetriamine, 5-propyldipropylenetriamine and so forth.

Other useful dialkylene triamines are those wherein a terminal nitrogen atom is a tertiary amine configuration such as 1,1-diethyldiethylenetriamine, 1,1-dimethyldiethylenetriamine, 1,1-dibutyldiethylenetriamine, 1,1-dimethyldipropylenetriamine, 1,1-dimethyldibutylenetriamine and so forth.

The alkylene sulfide to be reacted with polyamines such as those mentioned above to make the products of this invention will preferably be ethylene sulfide. The higher alkylene vic-sulfides such as 1,2-propylene sulfide, 2,3-butylene sulfide and the like may produce a mixture of isomers as product. Therefore, a preferred method of making the mercaptoalkylamino compounds where alkyl is propyl or longer chain than propyl is the condensation reaction discussed hereinafter.

Ring-opening reactions for making the compounds of this invention, besides the ethylene sulfide reaction discussed above, include ring opening of alkylene imines. By alkylene imines is meant vic-imino alkanes, where the imino nitrogen atom is attached to each of two adjacent carbon atoms.

In preparation of the compounds of this invention, such imines will be reacted with an alkylamine. In general, this cannot be a mercaptoalkylamine, because the mercapto group is subject to attack under the conditions employed to react the cyclic imine with amine. However if the hydrogen attached to sulfide in a mercaptoalkylamine is replaced by an aralkyl radical like benzyl, the sulfur atom is blocked and protected. Debenzylation can be later effected, as discussed hereinafter, to produce the corresponding mercaptan.

Thus the presently contemplated method comprises opening the ring of a vic-imino alkane in reaction with a benzylthioalkylamine. The method can be illustrated, for example, by reference to the reaction of 1,2-propylene imine with a benzylthioalkylamine, as shown in the following equation:

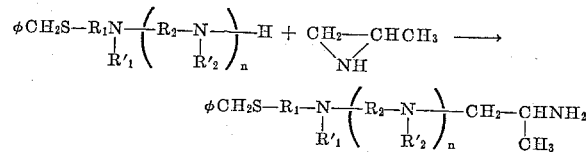

where each R and R', and $n$ are as defined above, and $\phi CH_2$ is the benzyl radical. It has been established that the imine ring opens preferentially at the least substituted carbon, and the 1,2-diamino products of such ring opening will be obtained as major or sole products of the reaction. Reaction of an imine as herein contemplated can usefully be employed to produce, by way of debenzylation of the benzylthio compound, not only the amines in which the terminal amine group is primary, but also those wherein this group is secondary, by employing an N-alkyl alkylene imine as the reactant.

Thus, presently useful imines comprise vic-imino alkanes such as ethylene imine, 1,2-propylene imine (2-methylaziridine), 2-methylpropylene imine (2,2-dimethylaziridine), 2,3-butylene imine (2,3-dimethylaziridine), N-methylethylene imine (1-methylaziridine), N-methylpropylene imine (1,2-dimethylaziridine), N-butylethylene imine (1-butylaziridine), and so forth.

The benzylthioalkylamines with which the imino compounds may be reacted in making the presently provided compounds are benzylthioalkyl amines and aminoalkylamines wherein alkyl is saturated aliphatic hydrocarbon, the terminal amine nitrogen atom carries at least one hydrogen substituent and any substituent other than H is saturated aliphatic hydrocarbon. Thus useful amines include, for example 2-(benzylthio)ethylamine, 3-(benzylthio)-1-propylamine, 2-(benzylthio) - 1 - butylamine, 2-(benzylthio)-1-propylnonylamine, 3-(benzylthio)-2-methylpropylamine, N-[2 - benzylthio)ethyl]ethylenediamine, N-[3-(benzylthio)propyl]ethylenediamine, N-[3-(benzylthio)propyl]1,3-propanediamine, N-[3-(benzylthio)propyl]-N'-methyl-1,3-propanediamine and so forth.

Products of such reaction will comprise for example, N-[2 - (benzylthio)ethyl]ethylenediamine, N-[3-(benzylthio)propyl]ethylenediamine, N-[3-(benzylthio)propyl] 1,3-propanediamine, N-[3-(benzylthio)propyl]-N-methyl-1,3-propanediamine, 1-[2-(benzylthio)ethyl]-5-methyldipropylenetriamine, 1-[2-(benzylthio)ethyl - 4 - methyldiethylenetriamine and so forth, which can be converted to corresponding mercaptans by debenzylation as described hereinafter.

Conditions for conducting the above-discussed reaction may consist merely of contacting the cyclic imine with the S-benzylamine. In this ring-opening reaction, the temperature may range from above freezing, to below the decomposition temperature of the reaction mixture components, broadly; more particularly, holding the reaction temperature at 50–100° C. is favorable. Generally, not more than about one mole of imine will be introduced per mole of the benzylthio compound, and less may be used to advantage; however, it will be obvious that addition of a mole of the imine to a preformed product of addition of the benzylthioalkylamine to the imine may give desired products, and thus higher ratios of imine may be desirable. Solvents and diluents are desirable, but not necessary. Useful solvents and diluents here include water as well as organic solvents including for example hydrocarbons such as benzene and hexane, ether such as diethyl ether and dioxane, alcohols such as methanol and ethanol, and so forth. The ring-opening reaction is promoted by catalysts, which are desirable though not essential, at least not in aqueous media. Useful catalysts are halides, such as ammonium chloride, aluminum chloride and the like. Elevated pressures, such as up to 5000 p.s.i., assist in shortening reaction times, but the reaction will proceed at atmospheric or lower pressures.

When the ring-opening reaction is that of an alkylene sulfide, such as ethylene sulfide, the sulfide and the amine are preferably each dissolved in a solvent when they are contacted. It is found that if the sulfide is added gradually to the polyamine in a solvent system and the total amount of ethylene sulfide added to the amine is not more than ⅕ to ⅒ mole per mole of the amine, the monomercaptoethylated products are formed as essentially the sole product. Useful solvents and diluents include, for example hydrocarbons such as benzene and hexane and inert ethers such as diethyl ether, dioxane, the dimethyl ether of diethylene glycol, and so forth. Desirably, the solvent will be a hydrocarbon. Where the amine is insoluble in a hydrocarbon such as benzene, it is sometimes advantageous to use a mixed solvent system as illustrated herein below and described in copending application S.N. 176,408, filed concurrently herewith by John C. James, and now U.S. Patent No. 3,231,612. The temperature of the reaction mixture is advantageously held at between about 50° and 100° C. Atmospheric pressures are suitable, though variation of pressure above and below atmospheric, down to say 50 mm., and up to say 500 p.s.i. may be employed if desired. To avoid side reactions, it is generally advantageous to maintain an atmosphere of nitrogen over the reaction mixture.

For the preparation of others of the compounds of the invention, an advantageous method of preparation consists in the condensation of an alkylene polyamine with a benzylhaloalkyl sulfide. The reaction of the amine with the benzylhaloalkyl sulfide proceeds in accordance with the following equation to provide a N-benzylthioalkyl alkylene diamine.

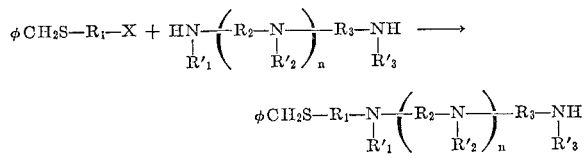

where $\phi CH_2$ is benzyl and R, R' and $n$ are as defined above.

The resulting N-benzylthioalkyl alkylenediamine or dialkylene triamine can be converted to the corresponding mercaptan by debenzylation, which can be effected by treatment with sodium in liquid ammonia, as described hereinafter.

Useful benzylhaloalkyl sulfides which may be employed in this method of arriving at the novel compounds of this invention include for example benzyl 3-chloropropyl sulfide, benzyl 3-bromopropyl sulfide, benzyl 3-iodobutyl sulfide, benzyl 2-chloropropyl sulfide, benzyl 2-chlorobutyl sulfide, benzyl 2-chloroethyl sulfide, and so forth.

The presently useful amines are the same as those stated above in connection with the discussion of the ethylene sulfide reaction.

Products of the condensation of the amine with the halide will correspond to the mercaptans of this invention, except that a benzylthio group will appear in place of the mercaptan group. Thus the products will include, for example, alkylene diamines such as N-[2-(benzylthio)ethyl]ethylenediamine, N-[3 - (benzylthio)propyl]ethylenediamine, N-[3-(benzylthio)propyl] - 1,3-propylenediamine, N-[3-(benzylthio)propyl] - N'-methylethylenediamine, N-[3 - (benzylthio)propyl] - N'-butylethylene diamine, N-[3-(benzylthio)-propyl]cyclohexylene - 1,4-bis(methylamine) and so forth. Illustrative of the products of reaction of dialkylene triamines with the benzylhaloalkyl sulfides are, for example, 1-[3-(benzylthio)propyl]-4-methyldiethylenetriamine, 1-[3-(benzylthio)propyl]-5-methyldipropylenetriamine, and the like.

Referring to conditions for the preparation of the compounds of the present invention by the stated condensation reaction, this may comprise merely contacting the halide with the amine to prepare the N-benzylthioalkyl alkylenepolyamine. Their ratio may be about 1:1 on a molar basis, or an excess of either may be used if desired. Acid is released by the condensation reaction, and desirably the halide and amine are contacted in the presence of a base such as salts containing oxygen in the anion, such as hydroxides like potassium hydroxide, oxides like lime, carbonates like sodium carbonate; tertiary amines like triethylamine and pyridine, and so forth. The amount of base used will generally be approximately the calculated quantity needed to neutralize acid released, but more, such as up to 5 times the theoretical equivalent, may be used if desired. The presence of solvents or diluents is desirable. These preferably are nonpolar solvents, such as hydrocarbons like benzene, hexane or the like. The temperatures of reaction may range from above freezing to below the decomposition temperatures of reaction mixture components; a range of 50 to 150° C. is generally suitable. The pressure may also vary over a wide range such as from subatmospheric pressures of down to say 50 millimeters (mm.) Hg up to superatmospheric pressures of 1000 lbs./sq. in. or above. Generally atmospheric pressures are suitable. It is usually desirable to maintain a nitrogen atmosphere over the surface of the reaction mixtures to avoid access of air.

Referring to the debenzylation of the benzylthioalkyl alkylene polyamines produced in accordance with the above-described procedure, this is effected by adding sodium to a stirred solution of the S-benzyl compound in liquid ammonia. Sufficient total sodium should be used to produce and maintain the characteristic dark blue color of a sodium liquid ammonia solution for a measurable time such as for at least about one-half hour, after the addition is complete. The ammonia may then be allowed to evaporate at ambient pressure and then final traces removed under reduced pressure (water pump), after which the reaction mixture will be acidified. To avoid oxidation, the reaction mixture is desirably blanketed with nitrogen or argon after removal of the ammonia solvent until acidification is accomplished. Acidification may and will desirably be preceded by adding water to the reaction mixture to solubilize the residue while the reaction mixture is cooled, as for example by chilling in an ice bath. The acid used to acidify the mixture may be any strong proton donor which will form an acid salt with the amine. Desirably it will be a physiologically acceptable acid forming a physiologically acceptable addition salt with the amine. Thus for example, useful acids include inorganic acids such as concentrated hydrochloric and organic acids such as maleic acid. Depending on the intended use of the product, indeed a toxic acid, such as oxalic acid, may be used if desired to form the addition salt. Sufficient acid will be added to provide one mole for each mole of amine groups in the product, the amount being necessary for this depending on whether the product is a diamine or a triamine. An excess of acid may be used, such as up to about 5 times in excess of the amount theoretically required to add to each of the amine groups in the debenzylated compound. The acidic mixture is now desirably extracted with the solvent for organic constituents, such as ether, or the like. The acidic aqueous portion is a solution of a mixture of the acid salt of the organic amine with inorganic salt, such as sodium chloride. The organic amine salt may be separated by evaporating the aqueous acid solution under reduced pressure to dryness, and then extracting the residue with a solvent for the organic amine salt such as an alcohol. Suitable solvents include methanol, ethanol and isopropyl alcohol. Concentration of this extract separates the inorganic salts as a precipitate which can be removed by filtration, after which solvent can be removed from the filtrate to isolate the amine hydrochloride.

Generally, isolation of the amine as a salt such as the above-mentioned addition salts is desirable, but if desired the amine itself may be recovered from the debenzylation reaction mixture or may be produced by treatment of the salt made as described above with alkali such as sodium hydroxide, thus freeing the amine. In general, however, the acid addition salts of these amines are the desirable form thereof; because of their water solubility, they are better adapted than the free amine for use in physiological applications such as the administration of parenteral injections to animals. For such use, the addition salts selected will be non-toxic salts such as the hydrochloride, maleate or the like. Practically any protonic acid can be used to form the acid addition salt, and useful acids, including physiologically acceptable acids, forming salts with amines are well known in the art.

The presently provided N-mercaptoalkyl alkylene polyamines and their addition salts as provided by this invention range from mobile liquids to crystalline solids. They are useful for a wide variety of industrial, pharmaceutical and agricultural applications. They have demonstrated activity in protecting animals against the harmful effects of ionizing radiation, and may be administered for this purpose. In general, simple aqueous solutions of the amine addition salts are suitable for use in this connection, providing physiologically acceptable media adapted for administration, as for example by parenteral injection. The amines may also be encapsulated for oral administration. For radiation protection, a dosage level of 350 to 500 mg. per kg. body weight (calculated on free amine) has been found effective. The compounds of the invention may also be administered in conjunction with other inert or active pharmaceutically acceptable substances, such as copper compounds, for example.

The present compounds, moreover, are useful as chelating agents and as intermediates for the production of chelating agents. As is known in the art of coordination chemistry, it is generally advantageous for chelating agents to be tetradenate. The N-mercaptoalkyl dialkylene triamines provided by this invention are tetradentate. The alkylene diamine derivatives of this invention are provided with but three coordinating sites: the SH group and each of the two nitrogen atoms. However, it will be observed that these compounds each contain a terminal amino hydrogen atom capable of further reaction. By virtue of the presence of this reactive site on the terminal nitrogen atom, these alkylene diamine compounds are susceptible to further reaction, to introduce a fourth coordinating group, by means of which they may be converted into tetradentate compounds capable of exhibiting strong chelating properties. Thus, for example, the diamines containing primary amine groups will react with a carbonyl compound such as acetyl acetonate to form a Schiff base containing a keto carbon atom isomerizable to a C—OH group having coordinating properties. Where the terminating nitrogen atom is a secondary amino group, it may be reacted with a compound such as a halide of a compound containing a coordinating site, such as for example, bromacetic acid. Such Schiff bases and other tetradentate derivatives of the compounds of this invention having three coordinating sites are of particular interest in that each of the four coordinating sites of the resulting tetradentate compound can be different. Thus, for example, a single tetradentate compound may contain a mercapto group, a secondary amino group, the imine nitrogen resulting from formation of a Schiff base, and an OH group attached to carbon, such as the OH group of a carboxylic acid group or the OH group produced by enolizing ketonic carbon atom.

In general, chelating compounds having four similar coordination sites tend to have a much stronger affinity for one type of metal than for another. Thus for example, a compound such as porphyrin containing 4 nitrogen atoms as coordinating sites has a strong coordinating effect on the transition metals such as iron, cobalt and nickel, whereas it is less effective in coordinating with alkaline earth metals such as calcium and the like. On the other hand, the sequestering agents used in the detergent industry, which have a strong affinity for alkaline earth metals such as magnesium and calcium, whose coordinating groups are based on a chalkogen element, such as the four carboxyls of EDTA (ethylenediamine tetra-acetic acid) are less effective in coordinating with transition metals like cobalt than are the coordination compounds such as porphyrin. All of the compounds of this invention comprise a chalkogen element coordinating group in the mercaptan radical, and comprise nitrogen atoms in coordinating groups also, and the above-discussed tetradentate derivatives of alkylene diamines may contain two of each. There are thus sites available for preferential coordination of both the transition metals and the alkaline earth metals, whereby these products are particularly versatile for a variety of chelating application. Thus for example, they may be used as sequestering agents to prevent undesired precipitation of alkaline earth metals, as scavenging agents to promote elimination of toxicants such as heavy metals from the body, and so forth. The coordination compounds of these chelating agents with metals can be used to provide controlled rate release of the metal, in a biological system for example and their chelation compounds with transition metals such as cobalt may be used to store oxygen for closed systems such as submarines. As will be recognized by those skilled in the art, the compounds particularly useful for use as chelating agents will be those capable of coordinating by forming 5-membered rings such as the aminoethylaminoethylamino ethanethiols of the invention and their derivatives, but are not limited thereto.

The presently provided compounds are also useful for a variety of other purposes. Thus for example, they may be employed as chemical intermediates, for example to produce bactericidal and detergent products by quarternization and to produce heterocycles containing N and S in the ring. These sulfur-containing compounds may also be used as rubber chemicals, as for example, as vulcanization and curing agents. The alicyclic compounds provided hereby have thermal stability unusually high for a mercaptan. Thus they are especially adapted for use, for example, as modifiers and promoters in emulsion polymerization processes, as additives to synthetic elastomers and like processes in which aminoalkyl mercaptans are exposed to thermal stress. The various products of the invention may also be employed as agricultural toxicants, to rid soil and plant stands of undesirable vegetation, nematodes and insects; as petroleum additives and the like.

The invention is illustrated but not limited by the following examples, in which all parts are by weight unless otherwise noted.

*Example 1*

This example illustrates preparation of a benzylthioalkyl alkylenediamine from ethylenimine, by ring opening of ethylenimine with a benzylthioalkylamine.

A stainless steel autoclave is charged with 376 parts of 2-(benzylthio)ethylamine, 32 parts of ethylenimine (providing an amine:imine molar ratio of 3:1), and 8 parts of ammonium chloride. The autoclave is closed, shaken to mix the contents, and placed in an oven, in which it is maintained at 85–90° C. for 25½ hours. The reaction product is removed from the autoclave, which is rinsed with methanol. The methanol rinsings are combined with the main reaction mixture, and the combined materials are distilled. The fraction boiling at 125–128° C. (column head temperature) at 0.08 millimeter (mm.) is recovered. This fraction has a refractive index of 1.556, and is N-[2-(benzylthio)ethyl]ethylenediamine, $d_4^{20}$ 1.063

Proceeding similarly, employing the appropriate 2-(benzylthio)ethylamine or 3-(benzylthio)propylamine and ethylenimine, N-alkylethylenimine or butylene-1,2- imine, the following N-(benzylthioalkyl)alkylenediamines are prepared:

N-[2-(benzylthio)ethyl]1,2-butanediamine,
B. 138–141°/0.7 mm., $n_D^{20}$ 1.5458, $d_4^{20}$ 1.024

N-[3-(benzylthio)propyl]ethylenediamine,
B. 136°/0.17 mm.–146°/0.35 mm., $n_D^{20}$ 1.5582, $d_4^{20}$ 1.047

N-[2-(benzylthio)ethyl]-N'-methylethylenediamine
B. 121–124°/0.10 mm. $n_D^{20}$ 1.5507, $d_4^{20}$ 1.034

N-[2-(benzylthio)ethyl]-N'-butylethylenediamine,
B. 157–158°/0.15 mm., $n_D^{20}$ 1.5317, $d_4^{20}$ 0.991

N-[3-(benzylthio)propyl]-N'-methylethylenediamine,
B. 130–134°/0.2 mm., $n_D^{20}$ 1.5463, $d_4^{20}$ 1.023

N-[3-(benzylthio)propyl]-N'-ethylethylenediamine,
B. 142–145°/0.03 mm., $n_D^{20}$ 1.5388, $d_4^{20}$ 1.033

N-[3-(benzylthio)propyl]-N'-butylethylenediamine,
B. 160–165°/0.15 mm., $n_D^{20}$ 1.5283, $d_4^{20}$ 0.982.

*Example 2*

This example illustrates the preparation of a N-benzylthioalkyl alkylenediamine by reaction of a diamine with a benzylhaloalkyl sulfide.

A reaction mixture is prepared by combining 100 parts of benzyl 3-chloropropyl sulfide with 175 parts of hexamethylenediamine and 28.5 parts of anhydrous sodium carbonate in absolute ethanol, the sulfide being added dropwise to the reaction mixture comprising the diamine and carbonate in ethanol, over a period of 2 hours, while the reaction mixture is held at reflux temperature. After addition of the sulfide is complete, the reaction mixture is refluxed for a further 24 hours after which it is cooled at room temperature and filtered. The filtrate is evaporated to remove solvent, and the residue filtered and distilled. N-[3-(benzylthio)propyl]-1,6-hexanediamine is recovered as the fraction boiling at 158–161° C./0.6 mm. The calculated molar refraction of the stated S-benzyl diamine is 87.82; found from the observed values $n_D^{20}$ 1.5384, $d_4^{20}$ 0.999, $M_D$ 87.49. The elemental analysis and infrared spectrum are also consistent with the assigned structure.

*Example 3*

This example illustrates debenzylation of an N-benzylthioalkyl polyamine to provide an N-mercaptoalkyl polyamine.

Enough sodium is added to anhydrous liquid ammonia to produce the characteristic blue color of sodium and liquid ammonia, and then N-[2-(benzylthio)ethyl]ethylenediamine, 56.4 parts, and sodium, 11 parts, are added alternately, portion-wise, to the ammonia over a period of about 1½ hours. Addition of the last of the sodium after the last of the amine causes the blue color to persist, showing completion of the reaction. Ammonia is now removed by evaporation while the mixture is stirred, leaving a residue of finely divided light brown powder, which gives a strong thiol test. This residue is stirred in an ice bath while water is added and then concentrated aqueous hydrochloric acid is introduced until the mixture is strongly acidic to litmus paper. The resulting acidic solution is extracted with ether and the aqueous layer separated and evaporated to dryness. The residue from this procedure is repeatedly extracted with isopropanol and the isopropanol extracts are combined and evaporated down. The residue comprises N-(2-mercaptoethyl)ethylenediamine dihydrochloride, which is isolated by repeated recrystallizations under nitrogen. An analytically pure sample is obtained by recrystallization from, first, methanol, then ethanol, then a mixture of dimethylformamide and methanol using ether to effect precipitation, and finally isopropanol; M. 152–154° C.

Proceeding similarly, the following N-mercaptoalkyl alkylene polyamines are prepared by debenzylation of the corresponding N-benzylthioalkyl alkylene polyamines:

2-[(2-aminobutyl)amino]ethanethiol dihydrochloride, M. 146–148° C.

3-[(2-aminoethyl)amino]propanethiol dihydrochloride, M. 167–170° (decomposition: "dec.")

2-[(2-methylaminoethyl)amino]ethanethiol dihydrochloride, M. 189–191° (dec.)

2-[(2-butylaminoethyl)amino]ethanethiol dihydrochloride, M. 240–241° (dec.)

3-[(2-methylaminoethyl)amino]propanethiol dihydrochloride, M. 207–209°

3-[(2-ethylaminoethyl)amino]propanethiol dihydrochloride, M. 217.5–218.5°

3-[(2-butylaminoethyl)amino]propanethiol dihydrochloride, M. 267–269° (dec.)

*Example 4*

This example illustrates mercaptoethylation of an alkylene polyamine with ethylene sulfide.

A solution of ethylene sulfide in benzene is added dropwise over a period of 2 hours, to a solution of 200 parts of 1,6-hexanediamine in benzene, previously dried by refluxing, while the reaction mixture is stirred and held at reflux temperature under a nitrogen atmosphere, until 13 parts of ethylene sulfide have been introduced. This provides a molar ratio of the diamine to the ethylene sulfide of about 8:1. After the addition of the ethylene sulfide solution is complete, the reaction mixture is refluxed for another 2 hours and then cooled. After solvent removal, the product is distilled under reduced pressure to give the desired 2-[(6-aminohexyl)amino]ethanethiol, B. 88°/0.13 mm., M. 38–40° C. The dihydrochloride is prepared by mixing the amine with aqueous hydrochloric acid in aqueous medium until an acid pH is reached: M. 193–196°.

Proceeding similarly the following mercaptoethylated polyamines are prepared:

2-[4-(aminomethyl)cyclohexylmethylamino]ethanethiol, B. 120–122°/0.4 mm., $n_D^{20}$ 1.5220, Dihydrochloride melting at about 340° (bar)

and the N-2-mercaptoethyl derivatives of the following diamines and triamine:

1,3-propanediamine, dihydrochloride, M. 165° (dec.)

1,4-butanediamine, B. 77–78°/0.3 mm., dihydrochloride, M. 204–205°

1,5-pentanediamine, B. 81°/0.05, dihydrochloride, M. 196–198°

1,7-heptanediamine, B. 104–108°/0.2 mm.

1,8-octanediamine, B. 112–113°/0.2 mm., dihydrochloride, M. 203–206°

1,10-decanediamine, B. 130–141°/0.4–0.9 mm., dihydrochloride, M. 225–228° (dec.)

3-[(3-aminopropyl)methylamino]propylamine B. 112–123°/0.4–0.8 mm., $n_D^{20}$ 1.5148, trihydrochloride, M. 130–133°

1,9-nonanediamine, which is unexpectedly found to be insoluble in benzene, is reacted with ethylene sulfide in a mixture of ethanol and benzene to provide 2-[(-9-aminononyl)amino]ethanethiol, B. 120–130° C./0.03 mm., hydrochloride, M. 219–224°.

*Example 5*

This example illustrates use of amines provided by this invention.

The dihydrochloride salt of N-(2-mercaptoethyl)ethylenediamine is dissolved in water to provide a physiologically acceptable saline solution. The solution is injected subcutaneously into mice at a dosage level of below 500 mg./kg. (based on free amine) previously determined to be sublethal. Fifteen minutes later, the injected animals are exposed to X-ray radiation at levels of 825 roentgens and 600 roentgens, along with other mice which have received an injection of neutralized aqueous HCl, as a control. The test animals are then held in cages where they are fed and watered while they are observed. At a radiation level sufficient to product death of the controls within a period of two to three weeks, animals receiving the amine survive beyond the full test period of 30 days.

While the invention has been described with particular reference to specific preferred embodiments thereof, it will be appreciated that modifications and variations can be made without departing from the scope of the invention as disclosed herein, which is limited only as indicated in the following claims.

What is claimed is:

1. Compounds selected from the class consisting of aminoalkylamino alkanethiols of the formula

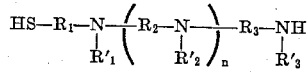

wherein
each R is saturated aliphatic hydrocarbon of up to 18 carbon atoms,
each R' is selected from the class consisting of hydrogen and saturated aliphatic hydrocarbon of up to 18 carbon atoms,
n is an integer selected from 0 and 1, containing at least two nitrogen atoms each having at least one hydrogen atom as a substituent; and acid addition salts thereof.

2. The compounds defined in claim 1, wherein the terminal amine group is primary amine.

3. The compounds defined in claim 2, containing two amino nitrogen atoms, and having from 2 to 3 carbon atoms intervening between nitrogen and sulfur.

4. 2-[(2-aminoethyl)amine]ethanethiol.

5. The compounds defined in claim 3 wherein the aliphatic radical intervening between the two amine groups comprises a cyclohexyl ring.

6. 2 - [(4 - aminomethylcyclohexylmethyl)amino]ethanethiol.

7. The compounds defined in claim 1, wherein each amine group is secondary amine.

8. 2-[(2-methylaminoethyl)amino]ethanethiol.

9. The compounds defined in claim 1, containing three amino nitrogen atoms.

10. 2 - [3 - (3 - aminopropylamino)propylamino]ethanethiol.

11. The compounds defined in claim 1 including a tertiary nitrogen atom.

12. 2 - (3 - [3 - aminopropyl methylamino]propylamino)ethanethiol.

13. Acid addition salts of 2-[(2-aminoethyl)amino]-ethanethiol.

14. Acid addition salts of 2-[(4-aminomethylcyclohexylmethyl)amino]ethanethiol.

15. Acid addition salts of 2-[(2-methylaminoethyl)-amino]ethanethiol.

16. Acid addition salts of 2-[3-(3-aminopropylamino)-propylamino]ethanethiol.

17. Acid addition salts of 2 -(3 - [(3-aminopropyl)-methylamino]propylamino)ethanethiol.

References Cited by the Examiner

UNITED STATES PATENTS

| 2,689,867 | 9/1954 | Mahan | 260—563 |
| 2,762,697 | 9/1956 | Doerr | 260—583 |
| 2,941,003 | 6/1960 | Shokal | 260—563 |
| 3,063,901 | 11/1962 | O'Leary | 167—65 |
| 3,063,902 | 11/1962 | Gray | 167—65 |

OTHER REFERENCES

Broz.: C.A., vol. 45, p. 9473 (1951).
Clinton et al.: J.A.C.S., vol. 70, pp. 950–955 (1948).
Kalkwarf: Nucleonics, vol. 18, No. 5, pp. 76–81 and 130–131 (1960).

CHARLES B. PARKER, *Primary Examiner.*

B. R. PADGETT, FLOYD D. HIGEL,
*Assistant Examiners.*